(12) United States Patent
Nakano et al.

(10) Patent No.: US 7,175,825 B2
(45) Date of Patent: Feb. 13, 2007

(54) METHOD OF PRODUCING TITANIA SOLUTION

(75) Inventors: Katsuyuki Nakano, Fukuoka-ken (JP); Eiko Higashi, Fukuoka-ken (JP); Takeshi Hayakawa, Fukuoka-ken (JP)

(73) Assignee: Sundecor Co., Ltd. (JP)

(*) Notice: Subject to any disclaimer, the term of this patent is extended or adjusted under 35 U.S.C. 154(b) by 238 days.

(21) Appl. No.: 10/863,722

(22) Filed: Jun. 8, 2004

(65) Prior Publication Data

US 2005/0123471 A1 Jun. 9, 2005

(30) Foreign Application Priority Data

Dec. 4, 2003 (JP) ............................. 2003-405457
Dec. 4, 2003 (JP) ............................. 2003-405458
Mar. 30, 2004 (JP) ............................. 2004-100337

(51) Int. Cl.
*C01G 23/00* (2006.01)

(52) U.S. Cl. ................ 423/610; 423/69; 423/85; 204/157.42; 204/157.51; 106/286.4; 106/287.19

(58) Field of Classification Search ............. 423/610, 423/69, 85; 204/157.42, 157.51; 106/286.4, 106/287.19
See application file for complete search history.

(56) References Cited

U.S. PATENT DOCUMENTS 5,275,645 A * 1/1994 Ternoir et al. ............. 106/2
6,794,065 B1 * 9/2004 Morikawa et al. ........ 428/699
6,905,814 B1 * 6/2005 Aubay et al. ............ 106/287.19

FOREIGN PATENT DOCUMENTS

| JP | 10-046317 | 2/1998 |
| JP | 2000-247639 | 2/2000 |
| JP | 2000-233928 | 8/2000 |
| JP | 2000-247638 | 9/2000 |
| JP | 2001-172019 | 6/2001 |

* cited by examiner

*Primary Examiner*—Timothy C. Vanoy
(74) *Attorney, Agent, or Firm*—Andrus, Sceales, Starke & Sawall, LLP

(57) ABSTRACT

Titania is dissolved in a hydrogen peroxide solution to produce an amorphous titania gel, then the amorphous titania gel and a hydrogen peroxide solution are mixed together to produce an amorphous titania sol, and then an alkali solution is supplied to the solution containing the amorphous titania sol to thereby adjust a pH of the solution to 2 to 10. Even if the obtained solution containing amorphous titania is, for example, left to stand at normal temperature for a long time, gelling or aggregation of titania can be suppressed. That is, it is possible to obtain a titania solution that can maintain the state where fine particles of titania are highly dispersed in the solution, over a long term.

15 Claims, 7 Drawing Sheets

| | pH | GEL OR AGGREGATION |
|---|---|---|
| EXAMPLE 1 | 7 | NON |
| COMPARATIVE EXAMPLE 1 | 1 | GEL |
| COMPARATIVE EXAMPLE 2 | 7 | NON |

METHOD OF PRODUCING TITANIA SOLUTION

TECHNICAL FIELD

The present invention relates to a method of producing a titania solution containing non-crystalline titania and/or crystalline titania, which is, for example, used as a material of a coating film that exhibits photocatalytic activity.

BACKGROUND OF THE INVENTION

Titania, i.e. titanium oxide ($TiO_2$), exhibits photocatalytic activity when subjected to light or the like applied thereto, and has been used as a material of coating films that are formed on the surfaces of various base materials such as ceramics, potteries, metals, fibers, resins, and building materials for the purpose of protecting the surfaces of the base materials and preventing, by virtue of its photocatalytic activity, the surfaces of the base materials from becoming dirty. As a technique of forming the titania coating film on the surface of the base material, there has been used, for example, a method of applying a solution containing non-crystalline titania onto the surface of the base material, drying it, and then calcining it, or a method of applying a solution containing crystalline titania onto the surface of the base material, and then heating to dry it at a low temperature.

As the foregoing solution containing non-crystalline titania, there is known, for example, such a solution that is obtained by dispersing fine particles of amorphous titania having a property of no existence of particle boundary into aqueous hydrogen peroxide. On the other hand, as the solution containing crystalline titania, there is known, for example, such a solution that is obtained by dispersing fine particles of anatase titania into water. Examples of conventional methods of producing these solutions will be briefly described hereinbelow.

First, description will be given about the method of producing the solution containing amorphous titania, i.e. non-crystalline titania. Titania is produced by mixing titanium tetraisopropoxide (TIP) and isopropanol (IPA) together at a predetermined mole ratio and agitating the mixture, then adding a predetermined amount of a liquid mixture of IPA and water into the mixture and agitating it. Then, the produced titania is separated from the mother liquid and then is subjected to airing to be dried, thereby obtaining powder of titania. Thereafter, the obtained powder is dissolved in aqueous hydrogen peroxide to produce a titania gel (a gel of titania), then aqueous hydrogen peroxide is further added as a dispersing agent to transform the titania gel to a titania sol (a sol of titania), thereby obtaining the titania solution containing fine particles of amorphous titania (e.g. see Patent Literature 1).

The solution containing amorphous titania, thus obtained, is applied in the form of a thin film onto the surface of a base material such as ceramics or metal and dried, then calcined at a predetermined temperature such as at 500° C. to transform amorphous titania to anatase titania, thereby forming a titania coating film that exhibits photocatalytic activity, on the surface of the base material (e.g. see Patent Literature 2).

On the other hand, the solution containing anatase titania, i.e. crystalline titania, is produced using, for example, a solution in which titanium hydroxide is dispersed, as a material. At the outset, ammonia and sodium hydroxide are added into an aqueous solution of inorganic titanium compound such as titanium chloride or titanium sulfate to produce a titanium hydroxide gel. After fully washing the produced titanium hydroxide gel, aqueous hydrogen peroxide is added to thereby obtain a titanic acid solution. Non-reacted hydrogen peroxide is decomposed on standing. Then, by applying a heat treatment to the obtained solution at a predetermined temperature for a predetermined time, crystalline nuclei of anatase are produced to thereby obtain the solution containing anatase titania. The solution containing anatase titania, thus obtained, is not required to be subjected to calcination as opposed to amorphous titania inasmuch as the contained anatase titania already has a property of exhibiting photocatalytic activity. Therefore, by applying the solution containing anatase titania onto the surface of a base material, and then drying it or heating it at a low temperature, a titania coating film that exhibits photocatalytic activity is formed (e.g. see Patent Literature 3).

[Patent Literature 1] JP-A-H10-167728
[Patent Literature 2] JP-A-H10-46317
[Patent Literature 3] JP-A-H10-67516

The foregoing solutions containing titania have, however, the following problems. Specifically, if, for example, the solution containing amorphous titania or anatase titania is left to stand for a long time, titania may be aggregated in the solution so that a high dispersion state of titania can not be maintained. For example, in case of the solution containing amorphous titania, since amorphous titania is dispersed in aqueous hydrogen peroxide as described above, the solution has a strong acidity with a pH of, for example, about 1. With such a strong acidity, amorphous titania may be subjected to condensation polymerization so as to be gelled or aggregated. Specifically, if, for example, the solution is left to stand at normal temperature, the viscosity of the solution may become high in several days, and further, titania may be gelled or lumped. On the other hand, in case of the solution containing anatase titania, particles of titania may be mutually attracted to be aggregated. Further, since titania is dispersed in aqueous hydrogen peroxide in the preparation process of the titania solution, if the heat treatment for crystallization is carried out in the state where hydrogen peroxide remains, titania before crystallization may be gelled or aggregated particularly in the initial stage of the heat treatment.

As another problem, in preparing either of the amorphous and anatase titania solutions, when titania is dissolved in aqueous hydrogen peroxide, the temperature of the solution rises due to heat of the dissolution so that hydrogen peroxide may be actively decomposed to produce, for example, bubbles of oxygen gas. Since these bubbles may become the cause of, for example, roughening the coating film, it is desirable to remove them. However, inasmuch as it takes time and labor for such removal, the production efficiency may be lowered. Further, if the solution is prepared in large quantity, the calorific value becomes large to boil the solution, which is dangerous for an operator.

As another problem of the solution containing amorphous titania, since, as described above, the solution shows the acidity with the pH of, for example, about 1, selection of base materials applicable with the coating is limited. Particularly, if the metal base material is selected and applied with the titania solution, the surface thereof may be corroded. Further, since amorphous titania itself can not exhibit photocatalytic activity, when amorphous titania is used as the material of the coating film, calcination is required after the application of the titania solution onto the surface of the base material to thereby transform amorphous titania to anatase titania in order to obtain photocatalytic activity. Consequently, there are those instances where sufficient calcination can not be carried out with respect to a base material having a low heat resistance, or a large base material such as a building. Moreover, in order to produce anatase titania by heating the solution containing amorphous titania as described in Patent Literature 3, the heat treatment is required for a long time so that it is difficult to improve the productivity.

SUMMARY OF THE INVENTION

The present invention has been made under these circumstances and has an object to solve the problem about the stability of the titania solution as a product, or the problem upon using aqueous hydrogen peroxide as a dispersing agent in the production process, and to provide a method of producing a titania solution in which a dispersion state of particles of titania is stable, by suppressing gelling or aggregation of titania.

It is another object of the present invention to provide a method that can easily produce a titania solution in which crystalline titania and non-crystalline titania are highly dispersed, to thereby ensure a high production efficiency.

According to one aspect of the present invention, there is provided a method of producing a titania solution, comprising the steps of dissolving titania in a first acid solution to produce a gel of amorphous titania; mixing the gel of amorphous titania and a second acid solution together to transform the gel of amorphous titania to a sol of amorphous titania; and supplying an alkali solution to the solution containing the sol of amorphous titania to adjust a pH of the solution to 2 to 10.

The step of producing the gel of amorphous titania may be a step of dissolving the titania while controlling a temperature of the first acid solution at 20° C. or below.

According to another aspect of the present invention, there is provided a method of producing a titania solution, comprising the steps of mixing titania and an acid solution together, and dissolving the titania while controlling a temperature of the acid solution at 20° C. or below, to thereby produce a gel of amorphous titania; and mixing the gel of amorphous titania and an acid solution together to transform the gel of amorphous titania to a sol of amorphous titania.

The method may further comprise a step of heating the solution containing the sol of amorphous titania at a predetermined temperature for a predetermined time to crystallize the amorphous titania to thereby produce anatase titania. This step may comprise a step of mixing particles of amorphous titania and water together, a step of applying ultrasonic waves to this mixture, and a step of heating the mixture applied with the ultrasonic waves, at a predetermined temperature to produce particles of anatase titania, and mix together the particles of anatase titania and the solution containing the sol of amorphous titania, and then heat the solution to produce anatase titania. The anatase titania may contain anatase-rutile titania. The titania solution may be a material of a coating film formed as a thin film on the surface of a base material and, in this case, the titania solution may contain silica.

According to another aspect of the present invention, there is provided a method of producing a titania solution, comprising the steps of mixing together titanium tetraalkoxide, alcohol, and water that is excessive in amount relative to the titanium tetraalkoxide, to produce anatase titania and amorphous titania; and dissolving the anatase titania and the amorphous titania in an acid solution to obtain a dispersed liquid in which the anatase titania and the amorphous titania are dispersed.

A mixing mole ratio of the titanium tetraalkoxide relative to the water may be, for example, 1/10~80. In this case, the titanium tetraalkoxide may be titanium tetraisopropoxide (TIP), and the alcohol may be isopropanol (IPA). The dispersed liquid may be heated at a predetermined temperature to produce anatase-rutile titania. The dispersed liquid may contain the alcohol. Further, the dispersed liquid may be a material of a coating film formed as a thin film on the surface of a base material. In this case, the dispersed liquid may contain silica.

Further, a production ratio between the anatase titania and the amorphous titania may be changed by changing a mixing mole ratio of the water relative to the titanium tetraalkoxide. The step of dissolving the anatase titania and the amorphous titania in the acid solution may be carried out while controlling a temperature of the acid solution at 20° C. or below. The method may further comprise a step of supplying an alkali solution to the dispersed liquid to adjust a pH of the dispersed liquid to 2 to 10.

According to the titania solution producing method of the present invention, by adjusting the pH of the titania solution containing amorphous titania to 2 to 10 using the alkali solution, gelling or aggregation of titania can be suppressed even if the solution is, for example, left to stand at normal temperature for a long time. That is, it is possible to obtain the titania solution that can maintain the state where fine particles of titania are highly dispersed in the solution, over a long term. Further, if the solution is, for example, used as the material of the coating film, since it is possible to adjust the pH of the solution depending on a base material by adjusting the amount of the alkali solution, the base material is rarely deteriorated.

Further, according to the titania solution producing method of the present invention, by mixing the water so as to be excessive in amount relative to titanium tetraalkoxide and alcohol, anatase titania being crystalline titania and amorphous titania being non-crystalline titania can be produced. Further, in the dispersed liquid obtained by dispersing the produced anatase titania and amorphous titania in the hydrogen peroxide solution, amorphous titania is interposed among the particles of anatase titania to suppress aggregation of the particles of anatase titania. Therefore, even if the titania dispersed liquid is left to stand over a long term, the state where the particles of anatase titania are highly dispersed in the solution can be maintained.

Further, according to the titania solution producing method of the present invention, anatase titania can be directly produced by hydrolysis of titanium tetraalkoxide, and therefore, the titania solution containing anatase titania can be easily produced without requiring, for example, a high temperature heat treatment.

DESCRIPTION OF THE PREFERRED EMBODIMENT

Figure 1:
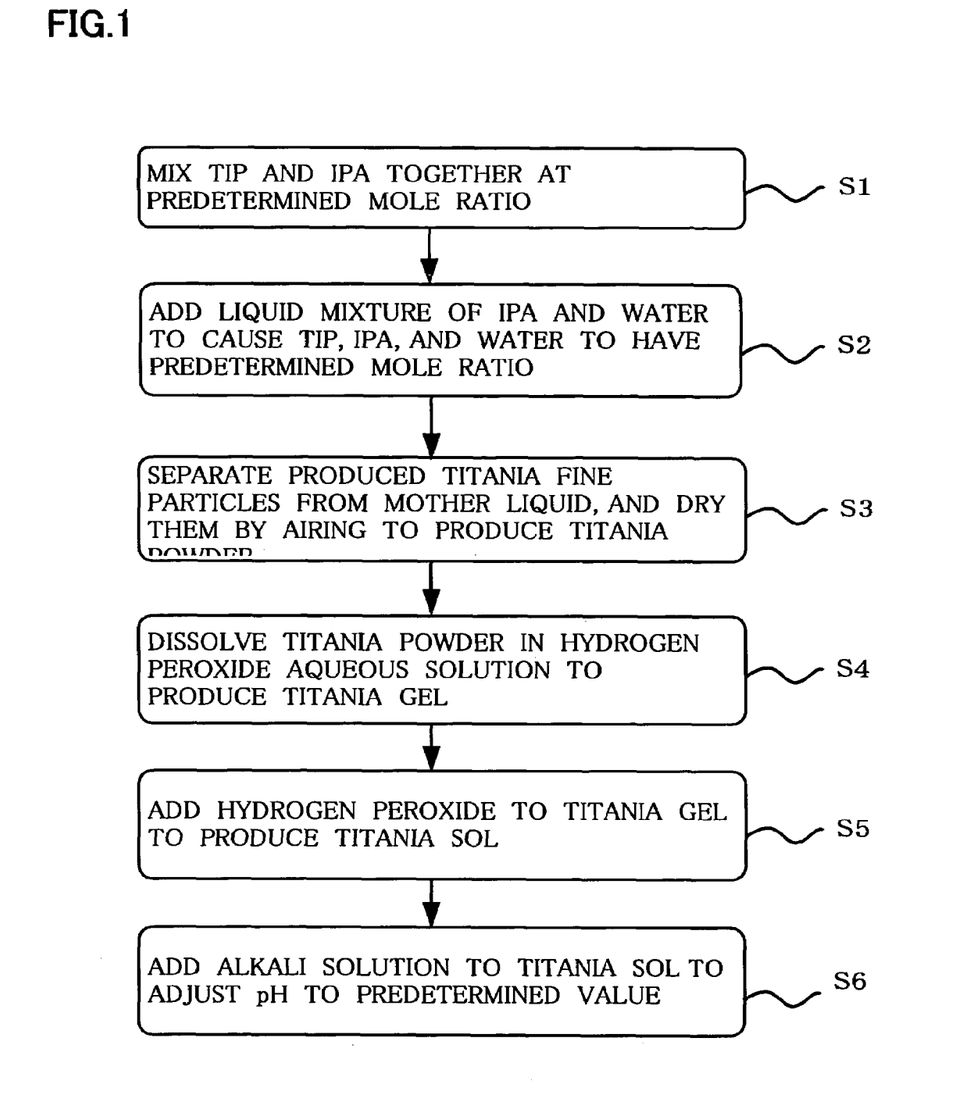
FIG. 1 is an explanatory diagram showing processes of producing a solution containing amorphous titania, according to a titania solution producing method of the present invention.

Referring to FIG. 1, description will be given about a method of producing a solution containing amorphous titania according to a preferred embodiment of the present invention. First, as shown in step S1 in FIG. 1, titanium tetraalkoxide, e.g. titanium tetraisopropoxide (TIP), and alcohol, e.g. isopropanol (IPA), are mixed together at a predetermined mole ratio such as TIP/IPA=1/5, and fully agitated. Then, as shown in step S2, a liquid mixture of IPA and water is added to cause TIP, IPA, and the water to have a predetermined mole ratio such as a mole ratio of TIP/IPA/water=1/5~10/4 and, by fully agitating the solution while controlling it at a predetermined temperature such as 25° C. to thereby promote hydrolysis of TIP, fine particles of titania are produced. Then, as shown in step S3, the fine particles of titania are separated from the mother liquid by the use of, for example, a filter, then are subjected to airing to be dried at a predetermined temperature such as at 100° C. for 20 hours, for example, to thereby obtain powder (fine particle groups) of titania.

Subsequently, as shown in step S4, an acid solution such as a hydrogen peroxide solution, e.g. an aqueous solution containing 10 to 50 weight % of hydrogen peroxide (aqueous hydrogen peroxide), is added to the titania powder and, by agitating the solution (titania dissolving liquid) while controlling a temperature thereof at 20° C. or below, preferably at 5 to 20° C., to thereby dissolve a predetermined amount of the titania powder, titania is gelled so that a titania gel is produced. This titania gel is composed of amorphous titania having no particle boundary. Further, as shown in step S5, the solution is agitated and simultaneously added with, as a dispersing agent, an acid solution such as a hydrogen peroxide solution, e.g. an aqueous solution containing 10 to 50 weight % of hydrogen peroxide (aqueous hydrogen peroxide), while a temperature of the solution is controlled at 20° C. or below, preferably at 5 to 20° C., so that the titania gel is transformed to a titania sol, i.e. formed into ultrafine particles, to be highly dispersed in the solution, thereby obtaining the solution containing amorphous titania and having a pH of, for example, about 1.

Further, as shown in step S6, a predetermined amount of an alkali solution such as ammonia, sodium hydroxide, or amin is added for decomposition so that a pH of the solution becomes, for example, 2 to 10, preferably 4 to 8. The pH value is determined based on a kind of base material when the solution is used as a material of a coating film, particularly based on an acid-proof property or an alkali-proof property of the base material. In this manner, there is obtained the solution containing amorphous titania having the average particle size of, for example, 10 to 28 nm. If metal ions other than titania, or organic substances are mixed into the solution due to the addition of the alkali solution, those will resultantly be impurities, and further, when the solution is used as a material of a coating film, those may generate harmful volatile substances upon heating the solution, and therefore, ammonia is preferably used. Ammonia may be, for example, aqueous ammonia (ammonia aqueous solution).

The foregoing solution containing amorphous titania is, for example, used as a material of a coating film. Specifically, the solution is applied to and/or impregnated into the surface of a base material such as ceramics, metal, glass, or building material so as to be formed as a liquid thin film on the surface of the base material. Then, after drying this liquid thin film, calcination is carried out at a temperature allowed depending on a kind of the base material, such as at 500° C., so that amorphous titania is transformed to anatase titania to thereby form on the surface of the base material a fine titania coating film that exhibits photocatalytic activity. The calcination temperature is not particularly limited. It may be set to 500° C., but is preferably set to a temperature that does not promote formation of rutile titania. The titania solution is not exclusively used as the material of the coating film, but may also be used as, for example, a material of toilet water.

According to the foregoing preferred embodiment, the pH of the solution is adjusted to 2 to 10, preferably 4 to 8, by adding alkali such as ammonia, and therefore, titania is rarely gelled or aggregated in the obtained solution even on standing for a long time. That is, there can be obtained the solution containing amorphous titania, which can maintain the state where fine particles of titania are highly dispersed, over a long term. Further, by adjusting the amount of addition of the alkali solution to set the pH of the solution to one of the values within the foregoing range depending on a property such as an acid-proof property or an alkali-proof property of a base material, the solution suitable for such a base material can be prepared. Specifically, when applied to the metal base material, the pH of the solution may be set to, for example, around seven for suppressing corrosion of the surface of metal.

Further, according to the foregoing preferred embodiment, when performing the process of gelling the titania powder (corresponding to step S4), aqueous hydrogen peroxide is added while controlling the temperature of the solution at the predetermined temperature such as at 20° C. or below, preferably at 5 to 20° C. because titania becomes reluctant to be dissolved due to lowering of solubility if the temperature is too low. As will be clear also from the results of later-described examples, this makes it possible to control the dissolution rate of titania and prepare the solution in a relatively short time. Specifically, since the calorific value caused by the heat of dissolution can be controlled, it is easy to control the temperature of the solution upon the preparation and it is possible to prepare the solution in a relatively short time. Consequently, the productivity can be improved. Further, also in the process of transforming the titania gel to the titania sol (corresponding to step S5), which is the secondary process, an effect like the foregoing can be achieved by adding aqueous hydrogen peroxide while controlling the temperature of the solution at the predetermined temperature such as at 20° C. or below, preferably at 5 to 20° C.

Figure 2:
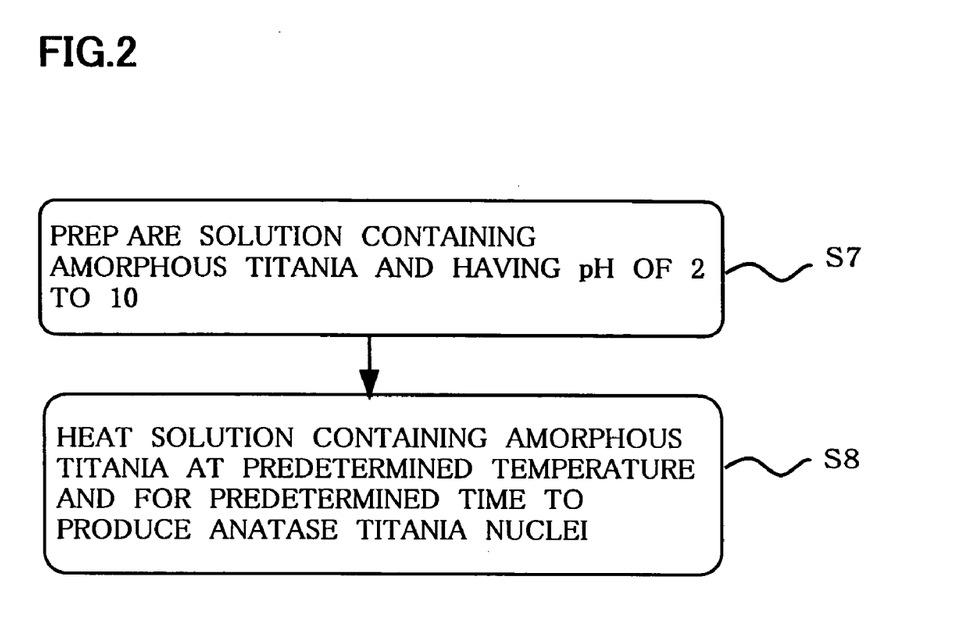
FIG. 2 is an explanatory diagram showing processes of producing a solution containing anatase titania, according to a titania solution producing method of the present invention.

Referring now to FIG. 2, description will be given about a method of producing a solution containing anatase titania according to another preferred embodiment of the present invention. As a material of the solution containing anatase titania, the solution containing amorphous titania obtained by the foregoing technique is used. First, as shown in step S7 in FIG. 2, there is prepared a solution containing amorphous titania and having a pH adjusted to, for example, 2 to 10, preferably 4 to 8, by adding the alkali solution in step S6 in FIG. 1. Then, as shown in step S8, the solution is heated, while being agitated, by the use of heating means such as a water bath or an autoclave at a predetermined temperature such as at 60° C. or above, preferably at 95 to 120° C., for a predetermined time such as 1 to 12 hours. In this event, amorphous titania is transformed to anatase titania to thereby obtain a solution containing fine particles of anatase titania. In this case, a portion of the transformed titania becomes anatase-rutile type titania (anatase-rutile titania) that forms a mixture of anatase titania and rutile titania.

The solution containing anatase titania, thus obtained, is applied to and/or impregnated into the surface of a base material such as ceramics, glass, metal, building material, resin or fiber so as to be formed as a coating thin film on the surface of the base material. When the solution containing anatase titania is used in this manner, calcination requiring high temperature heating is not necessary, and therefore, it is also applicable to coating of a base material such as resin that has a poor heat-proof property, and further applicable to coating of a base material such as an outside building that is difficult to calcine. From this aspect, the solution containing anatase titania is advantageously used. The titania solution is not exclusively used as the material of the coating film, but may also be used as, for example, a material of toilet water.

According to the foregoing preferred embodiment, by using the solution containing amorphous titania, which has the pH of 2 to 10, preferably 4 to 8, it is possible to suppress gelling or aggregation of amorphous titania before the transformation in the heat treatment, particularly in the initial stage of the heat treatment. Consequently, there can be obtained the titania solution in which fine particles of anatase titania are highly dispersed. Further, in this case, inasmuch as it is possible to omit processes of decomposing excessive hydrogen peroxide contained in the solution and removing bubbles generated from hydrogen peroxide, it is advantageous in that the production efficiency can be improved. Incidentally, if the pH of the solution is higher than eight, the promotion of generation of titania nuclei is lowered. On the other hand, if the pH of the solution is too low, titania is gelled in the heating, particularly in the initial stage of the heating as described above. That is, it is preferable to use the solution containing amorphous titania, which has a pH of 4 to 8.

In the present invention, titania dissolved in aqueous hydrogen peroxide for obtaining the amorphous titania gel is not limited to titania obtained using titanium tetraalkoxide as a material. It is also possible to use a solution containing a titanium hydroxide gel obtained using, as a material, an inorganic titanium compound such as titanium chloride or titanium sulfate. However, in this case, it is difficult to fully remove chlorine components or sulfuric acid components even by washing or calcination. If the chlorine or sulfuric acid components remain in the coating film, they are reacted with metal ions such as iron ions floating in the atmosphere to exhibit a light brown. Therefore, if a coating film is formed on a base material such as an external wall, the surface thereof may look dirty although dirt proofing by virtue of photocatalytic reaction of titania is one of objects of forming the coating film on the base material. Accordingly, by using the organic material such as TIP like in this preferred embodiment, it is expected to prevent the coating film from coloring.

Subsequently, a method of producing a solution containing anatase titania using amorphous titania as a material will be described according to another preferred embodiment of the present invention. The amorphous titania powder obtained in step S3 in FIG. 1, for example, is added into water such as pure water, then agitated. An ultrasonic treatment is applied to this solution, wherein, for example, ultrasonic waves are applied to the solution for a predetermined time, so that amorphous titania is formed into ultrafine particles which are highly dispersed in the water. Then, this water is heated to, for example, 100° C., so that amorphous titania is crystallized to be transformed to anatase to thereby obtain a solution in which ultrafine particles of anatase titania are highly dispersed. Then, this solution is mixed with the solution obtained in step S7 in FIG. 2, then the mixture is subjected to the heat treatment performed in step S8. In this case, when the ultrasonic waves are applied, amorphous titania is pulverized into ultrafine particles and, when heated, these ultrafine particles serve as nuclei to promote generation of fine particles of anatase titania.

Figure 3:
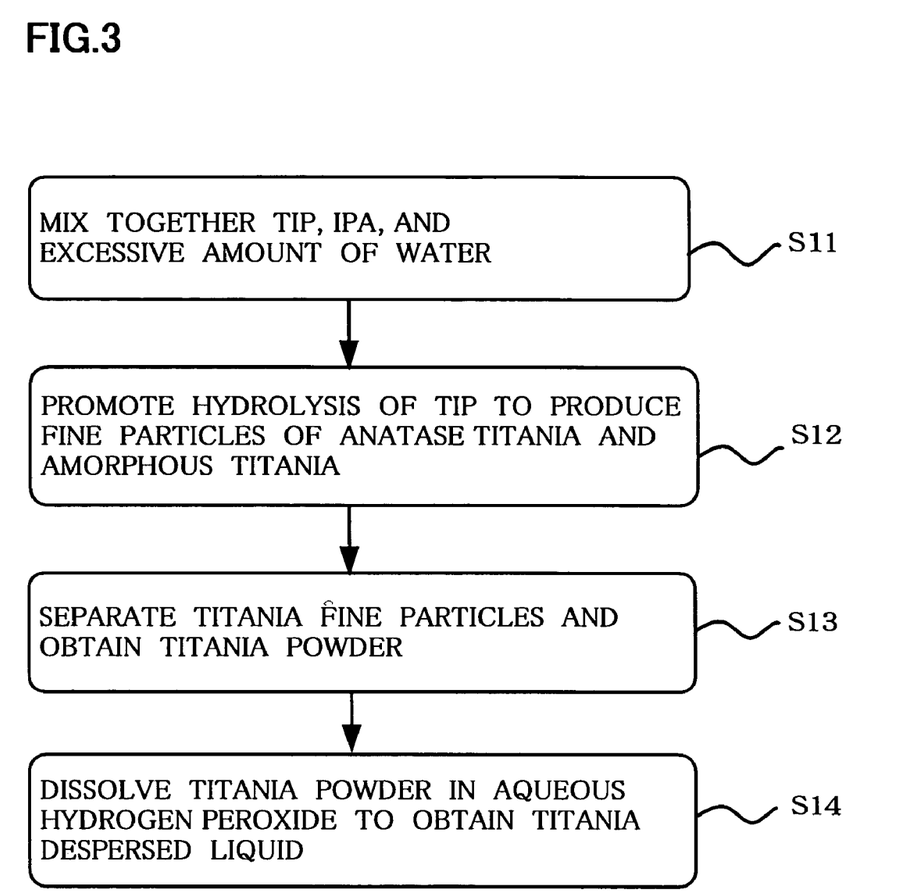
FIG. 3 is an explanatory diagram showing processes of producing a solution containing amorphous titania and anatase titania, according to a titania solution producing method of the present invention.

Referring now to FIG. 3, description will be given about a method of producing a solution containing amorphous titania and anatase titania according to another preferred embodiment of the present invention. First, as shown in step S11 in FIG. 3, titanium tetraalkoxide such as titanium tetraisopropoxide (TIP), alcohol such as isopropanol (IPA), and water are mixed together at a predetermined mole ratio such as TIP/IPA/water=1/5~10/10~80, and this liquid mixture is agitated. In this event, in order to allow the water to be excessive in amount relative to TIP, the mole ratio is set such that, for example, TIP/water=1/10~80, preferably TIP/water=1/10~15. Then, as shown in step S12, by fully agitating the liquid mixture while controlling it at a predetermined temperature such as 25° C., hydrolysis of TIP is promoted so that fine particles of anatase titania being crystalline titania and fine particles of amorphous titania being non-crystalline titania are produced in the solution. Incidentally, in step S11, TIP and IPA may be first mixed together, then IPA and the water may be mixed to this liquid mixture to achieve the foregoing predetermined mole ratio.

Subsequently, as shown in step S13, the fine particles of anatase titania and amorphous titania are separated from the mother liquid by the use of, for example, a filter, then are subjected to airing to be dried at a predetermined temperature such as at 100° C. for 20 hours, for example, to thereby obtain powders (fine particle groups) of anatase titania and amorphous titania. Then, as shown in step S14, an acid solution such as a hydrogen peroxide solution, e.g. an aqueous solution containing 10 to 50 weight % of hydrogen peroxide (aqueous hydrogen peroxide), is added to the titania powders and, by agitating the solution (titania dissolving liquid) while controlling a temperature thereof, for example, at 20° C. or below, preferably at 5 to 20° C., to thereby dissolve and disperse the titania powders in the solution. In this manner, there is obtained a titania solution being a titania dispersed liquid in which fine particles of anatase titania and fine particles of amorphous titania are dispersed. Incidentally, even if the mole ratio of the water relative to TIP and IPA is increased to exceed the foregoing range, no influence is caused on the reaction about the production of anatase titania. However, since a long time is required for filtering the liquid mixture, it is desirable to set the mole ratio within the range of TIP/IPA/water=1/5/10~80, preferably TIP/IPA/water=1/5/10~15.

The foregoing titania solution is, for example, used as a material of a coating film. Specifically, the solution is applied to and/or impregnated into the surface of a base material such as ceramics, metal, glass, or building material so as to be formed as a liquid thin film on the surface of the base material. Then, by drying this liquid thin film at a temperature such as a room temperature or an outside air temperature depending on characteristics of the base material such as materiality, size, and use of the base material, e.g. the base material being an external wall, a coating film is formed in which amorphous titania and anatase titania are uniformly dispersed. The drying temperature is not particularly limited, but is preferably set to a temperature that does not promote formation of rutile titania. In this coating film, anatase titania having a property of exhibiting photocatalytic activity is highly dispersed using amorphous titania as a binder. Therefore, the coating film has a high adhesion relative to the base material. Accordingly, it is possible to form the stable coating film with less exfoliation of titania. Incidentally, the coating film may be heated to a high temperature such as 500° C. to transform amorphous titania to anatase titania.

According to the foregoing preferred embodiment, the water is mixed so as to be excessive in amount relative to TIP, so that anatase titania being crystalline titania can be produced by the hydrolysis reaction of TIP. Therefore, anatase titania can be easily produced in a short time without carrying out the calcination or the high temperature heat treatment for a long time for the purpose of titania transformation which is required in the foregoing conventional technique. Consequently, it is possible to improve the productivity and reduce the production cost.

Further, according to the foregoing preferred embodiment, titania is produced by mixing the water so as to be excessive in amount relative to TIP, so that anatase titania being crystalline titania and amorphous titania being noncrystalline titania can be produced in one solution in the state where they are uniformly dispersed. Then, in the titania dispersed liquid wherein anatase titania and amorphous titania are dispersed in aqueous hydrogen peroxide, amorphous titania in the form of ultrafine particles serves to disperse particles of anatase titania, i.e. amorphous titania is interposed among the particles of anatase titania, so that it is possible to suppress aggregation of the particles of anatase titania which is caused by mutual attraction thereof. Therefore, even if the titania dispersed liquid is left to stand over a long term, the state where anatase titania and amorphous titania are highly dispersed in the solution can be maintained so that the stability of the solution is high.

Moreover, according to the foregoing preferred embodiment, when dissolving the titania powders in aqueous hydrogen peroxide, aqueous hydrogen peroxide is added while controlling the temperature of the solution at the predetermined temperature, for example, at 20° C. or below, preferably at 5 to 20° C. This makes it possible to control the dissolution rate of titania and prepare the solution in a relatively short time. As a result, it is possible to improve the productivity.

The foregoing preferred embodiment is not limited to the configuration wherein the water is mixed so as to be excessive in amount relative to TIP, but may also be configured that, for example, the water is mixed so as to be excessive in amount relative to TIP and IPA. One example can be cited wherein TIP/IPA/water=1/5/10~80, preferably TIP/IPA/water=1/5/10~15. Even by setting like this, it is possible to achieve an effect like the foregoing.

Further, in the foregoing preferred embodiment, by changing the mole ratio of the water relative to TIP or TIP and IPA within the foregoing setting range in step S11 in FIG. 3, it is possible to change the production ratio between anatase titania and amorphous titania. Specifically, the production ratio of anatase titania can be increased by increasing the amount of the water, while the production ratio of amorphous titania can be increased by decreasing the amount of the water. That is, by controlling the mixing ratio of the materials being the condition of production reaction of titania, it is possible to easily produce a titania solution containing anatase titania and amorphous titania at desired concentrations.

Further, in the foregoing preferred embodiment, it may also be configured that an alkali solution such as ammonia, sodium hydroxide, or amin is added into the titania dispersed liquid obtained by dissolving titania in aqueous hydrogen peroxide in step S14 in FIG. 3, to thereby adjust a pH of the titania dispersed liquid to, for example, 2 to 10, preferably 4 to 8. With this configuration, it is possible to keep the highly dispersed state of amorphous titania that is liable to be gelled or aggregated under the strong acidity condition. Consequently, it is possible to suppress aggregation of fine particles of anatase titania more reliably. The inventors have been confirmed that a solution of which a pH was set to 7 by adding the alkali solution as described above was not subjected to gelling or aggregation of titania even if the solution is left to stand over a week.

When adjusting the pH of the solution by adding the alkali solution, a value thereof may be determined depending on, for example, a kind of base material. One example can be cited wherein when the solution is applied to and/or impregnated into a metal base material, the pH of the solution is set to around seven for suppressing corrosion of the surface of the metal base material. With this configuration, it is possible to prepare the solution suitable for materiality of the base material such as an acid-proof property or an alkali-proof property, so that the surface of the base material is less corroded. If metal ions other than titania, or organic substances are mixed into the solution due to the addition of the alkali solution, those will resultantly be impurities, and further, when the solution is used as a material of a coating film, those may generate harmful volatile substances upon heating the solution, and therefore, ammonia, is preferably used. Ammonia may be, for example, aqueous ammonia.

Further, in the foregoing preferred embodiment, the titania solution being the titania dispersed liquid may contain alcohol such as IPA at a concentration of, for example, 50 weight % or less. IPA may be added after dissolving the titania powders in aqueous hydrogen peroxide or, when the solution is used as the material of the coating film, IPA may be added before applying the solution onto the base material. When the solution contains IPA, aggregation of amorphous titania can be suppressed when, for example, the solution is applied to the surface of the base material. Consequently, the fine coating film can be formed.

Moreover, in the foregoing preferred embodiment, the titania solution containing anatase titania and amorphous titania may be subjected to a heat treatment, such as a water-bath heat treatment, at 60° C. or above, preferably at 95 to 120° C., for a predetermined time such as 1 to 12 hours, to thereby transform amorphous titania to anatase titania to produce an anatase titania solution. In this case, a portion of titania in the solution is transformed, by heating, to produce anatase-rutile type titania (anatase-rutile titania)

that forms a mixture of anatase titania and rutile titania. It is preferable that the weight ratio of this anatase-rutile titania be set to, for example, 4/6 (rutile/anatase), particularly 35/65. The titania solution thus obtained exhibits extremely high activity under irradiation of ultraviolet light or visible light as obvious from the results of later-described examples. Further, in the foregoing preferred embodiment, the titania solution is not exclusively used as the material of the coating film, but may also be used as, for example, a material of toilet water.

Herein, examples of titania solutions each particularly suitable as a material of a coating film will be described. The foregoing titania solution containing amorphous titania and/or anatase titania, and a solution containing silica such as amorphous silica being non-crystalline silica are mixed together to produce a titania solution containing silica. In this case, the produced titania solution is applied to and/or impregnated into the surface of a base material and then dried to thereby form a coating film. Specifically, at the outset, a solution as a liquid mixture of a precursor to amorphous silica, such as TEOS (tetraethyl ortho silicate), and alcohol such as IPA (isopropyl alcohol) is added with an inorganic acid such as nitric acid to promote a hydrolysis reaction of TEOS, thereby producing fine particles of amorphous silica in the solution. This solution containing amorphous silica is added with, for example, aqueous ammonia to adjust a pH, then the pH-adjusted solution is added into the titania solution obtained through the foregoing processes to produce a solution containing amorphous and/or anatase titania and amorphous silica. Further, the produced solution is added with aqueous ammonia to adjust a pH, then the pH-adjusted solution is applied to and/or impregnated into the surface of a base material and dried, thereby forming a titania-silica coating film.

Since the coating film thus formed has silica existing therein, the refractive index of light on the surface thereof is lowered. Therefore, it is possible to suppress reflection of light such as sunlight or illumination light on the surface thereof as compared with the coating film containing only titania. Further, the reflection state of light can be controlled by adjusting the content of silica. Moreover, two or more coating films may be stacked on the surface of a base material. Specifically, after forming a coating film on the surface of the base material, another coating film is formed on the surface of such a coating film by the use of the same technique. In this case, films of different kinds may be stacked, e.g. a titania-silica film may be formed on a titania film, or films of the same kind may be stacked, e.g. titania films or titania-silica films may be stacked. The number of film layers may be determined depending on, for example, a kind of base material. A solution containing silica is not limited to a solution containing amorphous silica, but may be a solution wherein, for example, particle groups of crystalline silica are dispersed.

EXAMPLES

Now, description will be given about examples that have been carried out for confirming the effects of the present invention.

Example 1

In this example, a solution containing amorphous titania was produced using the foregoing technique. At the outset, TIP and IPA were mixed together at a mole ratio of TIP/IPA=1/5, then a liquid mixture of IPA and water was added to obtain a liquid mixture having a mole ratio of TIP/IPA/water=1/10/4. Subsequently, the liquid mixture was agitated while controlling a temperature thereof at 25° C., to thereby produce fine particles of titania. Titania was separated from the mother liquid through suction filtration, then dried by airing at 100° C. to thereby obtain titania powder. The titania powder was added with 31 weight % aqueous hydrogen peroxide, then this solution was agitated while being controlled at 10° C., to thereby obtain a titania gel. After further adding 31 weight % aqueous hydrogen peroxide, ammonia was added into the solution to adjust a pH to 7. The thus obtained solution containing fine particles of amorphous titania was left to stand at normal temperature, and the state of the solution after a lapse of one week, particularly whether or not titania was gelled or aggregated, was confirmed.

Comparative Example 1

This comparative example was the same as Example 1 except that the alkali solution was not added. A pH of a solution obtained in this comparative example was 1.

Comparative Example 2

In this comparative example, the alkali solution was not added, and excessive hydrogen peroxide was spontaneously decomposed while agitating a solution to remove bubbles. A pH of the solution obtained in this comparative example was 7.

(Result and Consideration about Example 1, Comparative Example 1, and Comparative Example 2)

Figure 4:
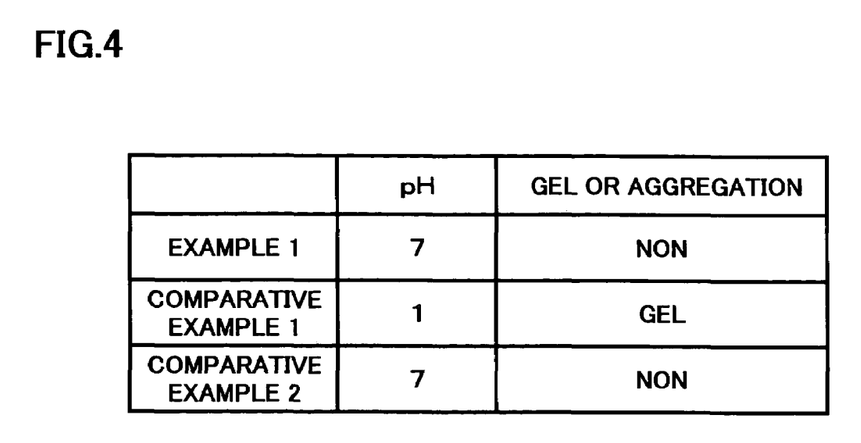
FIG. 4 is a characteristic diagram showing an example carried out for confirming an effect of the present invention.

The result of comparison among Example 1, Comparative Example 1, and Comparative Example 2 is shown in FIG. 4. As clear from the result, the solution of Comparative Example 1 was increased in viscosity after several days, then titania was gelled after a lapse of one week, and the solution exhibited a yellow. On the other hand, with respect to the solution of Example 1, titania was not gelled or aggregated even after a lapse of one week. Similarly, the solution of Comparative Example 2 was not subjected to gelling or aggregation of titania. However, several days were required for decomposing excessive hydrogen peroxide while producing the solution, and therefore, it is not practical in terms of the production efficiency. From the foregoing result, it has been confirmed that gelling and aggregation of titania can be suppressed by adding ammonia.

Example 2

In this example, titania powder was dissolved in aqueous hydrogen peroxide while controlling the solution at a predetermined temperature. This process corresponds to step S4 in FIG. 1. First, 1 g of amorphous titania powder was measured into each of 100 ml sample bottles, and 15 weight % aqueous hydrogen peroxide was added thereto. In this event, thermostats were used to control temperatures of the solutions at 5° C., 10° C., 20° C., 30° C., and 40° C., respectively. Then, a time (dissolution time) was measured from addition of aqueous hydrogen peroxide to dissolution of titania with respect to each solution. At a time instant when the titania powder was not visually observed, it was judged that titania was dissolved.

Result and Consideration about Example 2

Figure 5:
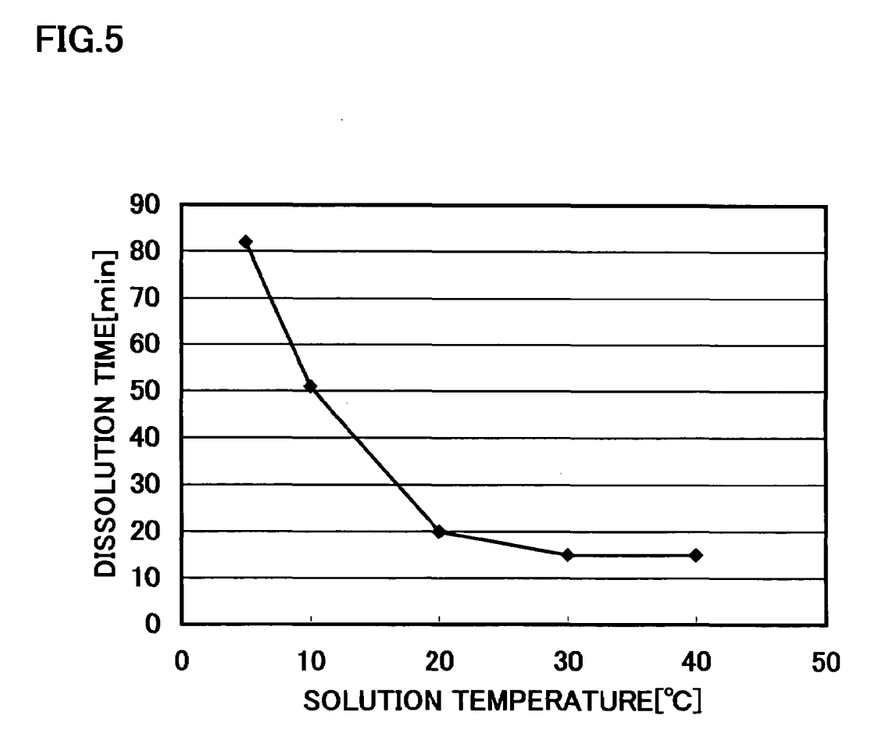
FIG. 5 is a characteristic diagram showing an example carried out for confirming an effect of the present invention.

The result about a dissolution time at each temperature was shown in FIG. 5. As clear from the result, the dissolution time was 82 minutes at 5° C., 51 minutes at 10° C., and 20 minutes at 20° C. On the other hand, the dissolution time was 15 minutes at 30° C. and 40° C., respectively, wherein the dissolution time was substantially constant at 30° C. or higher. From the foregoing result, it has been confirmed that the dissolution rate of titania differs depending on the temperature of the solution, and it is possible to control the dissolution rate of titania, i.e. the calorific value caused by the heat of dissolution, by controlling the temperature of the solution. Incidentally, even if the dissolution requires, for example, 82 minutes at 5° C., since a relatively long time is required for carrying out a series of processes (steps S1 to S6) for producing the solution containing amorphous titania, it is considered that an influence upon the production efficiency is small.

Example 3

In this example, a titania dispersed liquid was produced using the foregoing technique of mixing water excessive in amount relative to TIP. First, TIP, IPA, and water were mixed together at a mole ratio of TIP/IPA/water=1/5/10 to obtain a liquid mixture. Then, the liquid mixture was agitated while being controlled at 25° C., to thereby produce fine particles of titania. Titania was separated from the mother liquid through suction filtration, then dried by airing at 100° C. to thereby obtain titania powder. The titania powder was added with 31 weight % aqueous hydrogen peroxide, then this solution was agitated while being controlled at 20° C., to thereby obtain a titania dispersed liquid. This dispersed liquid is called a solution A.

Comparative Example 3

In this comparative example, TIP, IPA, and water were mixed together at a mole ratio of TIP/IPA/water=1/10/4 to obtain a liquid mixture, then the processes like in Example 1 were performed to obtain a titania dispersed liquid. This dispersed liquid is called a solution D.

(Test 1)

Powder X-ray diffraction (XRD) was carried out for analyzing crystal systems of the titania particles contained in the solution A and the solution D obtained in Example 3 and Comparative Example 3, respectively. First, the solutions were dried at 120° C. for one hour to obtain sample powders for measurement, respectively. Then, these samples were analyzed by the use of a powder X-ray diffractometer.

(Result and Consideration about Test 1)

Figure 6:
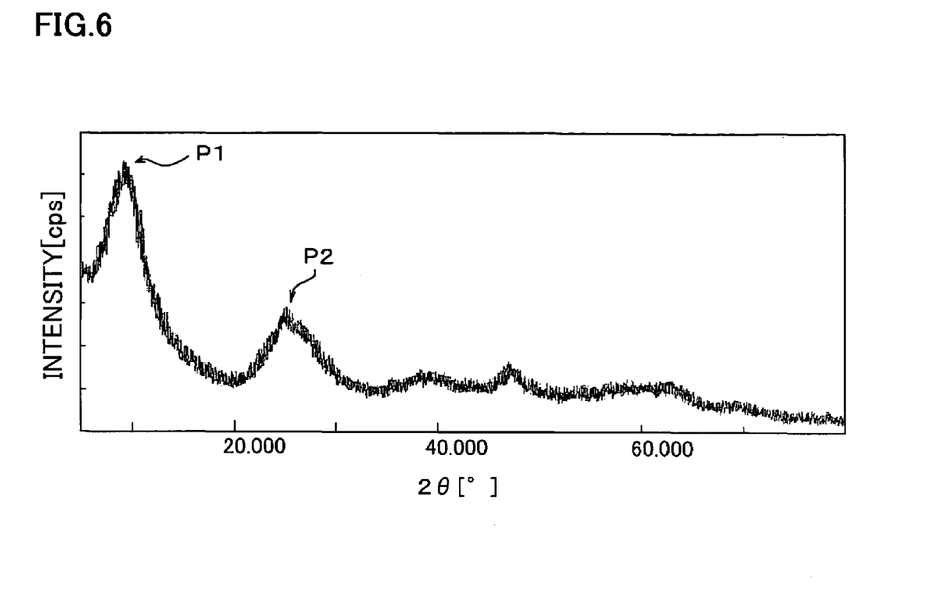
FIG. 6 is a characteristic diagram showing an example carried out for confirming an effect of the present invention.
Figure 7:
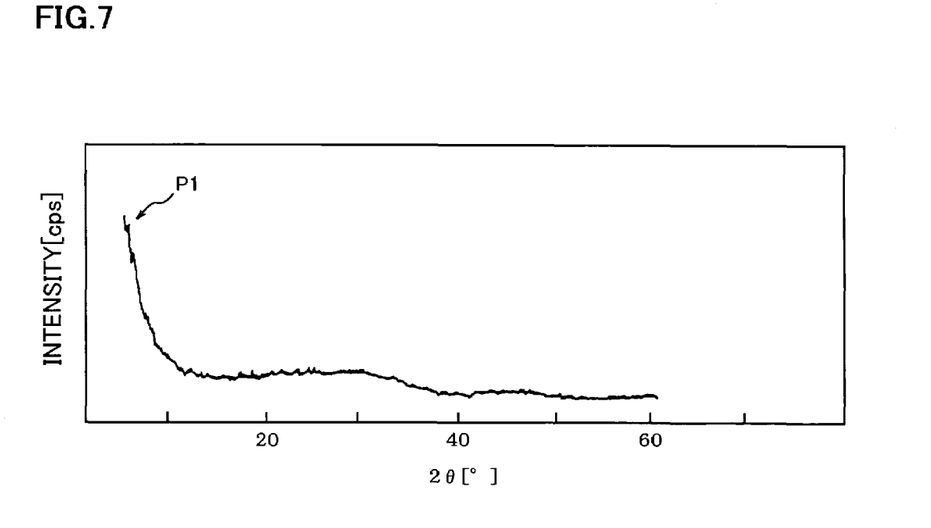
FIG. 7 is a characteristic diagram showing an example carried out for confirming the effect of the present invention.

The diffraction result about titania in the solution A is shown in FIG. 6, while the diffraction result about titania in the solution D is shown in FIG. 7. As clear from these results, a peak P1 of amorphous titania and a peak P2 of anatase titania appear in the diffraction spectrum of titania in the solution A, while only a peak P1 of amorphous titania appears in the diffraction spectrum of titania in the solution D. Specifically, it has been confirmed that both amorphous titania and anatase titania can be produced by mixing the water excessive in amount relative to TIP.

Example 4

In this example, another titania dispersed liquid was produced using the solution A of Example 3. Aqueous ammonia was added to the solution A produced as described above to adjust a pH of the solution to 3 to 4, then this solution was subjected to a water-bath heat treatment at 97° C. for 4 hours. This titania dispersed liquid is called a solution B.

Example 5

In this example, a titania dispersed liquid was produced like in Example 4 except that a water-bath heat treatment was carried out at 97° C. for 9 hours. This dispersed liquid is called a solution C.

Comparative Example 4

In this comparative example, another titania dispersed liquid was produced using the solution D in Comparative Example 3. Aqueous ammonia was added to the solution D produced as described above to adjust a pH of the solution to 3 to 4, then this solution was subjected to a water-bath heat treatment at 85° C. for 18 hours. This titania dispersed liquid is called a solution E.

Comparative Example 5

In this comparative example, a solution containing anatase titania was produced based on the technique described in detail in Patent Literature 3 referred to in the column of "BACKGROUND OF THE INVENTION". At the outset, a 60 weight % titanium tetrachloride aqueous solution and 2.5 weight % aqueous ammonia were mixed together to produce titanium hydroxide. After fully washing the produced titanium hydroxide, 30 weight % aqueous hydrogen peroxide was added to thereby obtain a titanic acid solution. Non-reacted hydrogen peroxide was decomposed on standing. Then, by applying a heat treatment to the obtained solution at 100° C. for 6 hours, an anatase titania dispersed liquid was obtained. This solution is called a solution F.

Comparative Example 6

In this comparative example, a solution containing oxygen deficient titania having a bonding strength between titanium (Ti) and oxygen (O) smaller than 2 was produced based on the technique reported in JP-A-2003-275600. This solution is called a solution G.

(Test 2)

Figure 8:
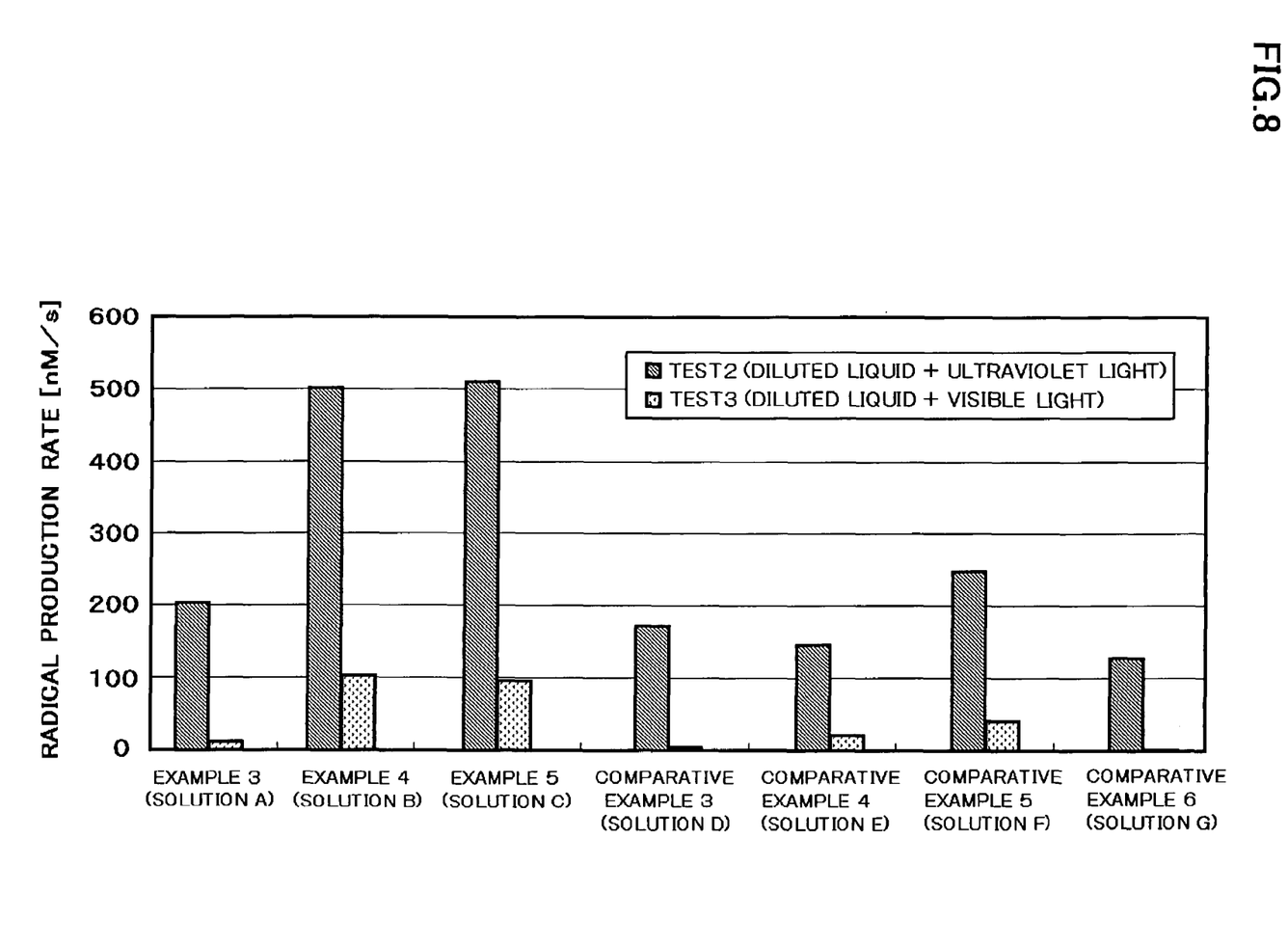
FIG. 8 is a characteristic diagram showing examples carried out for confirming the effect of the present invention.

0.03 ml of each of the solutions A to C in Examples 3 to 5 and the solutions D to G in Comparative Examples 3 to 6 was measure into 3 ml of distilled water containing a fluorescent reagent (concentration of HPF (hydroxyphenyl fluorescein) was 10μM) to thereby produce samples for analysis. That is, each of the solutions A to G was diluted to 1 volume %. Each sample was placed under irradiation of ultraviolet light by the use of a blacklight for 10 minutes while being agitated. Thereafter, the irradiation of ultraviolet light was stopped and each sample was agitated for 10 minutes in darkness. Then, the fluorescence intensity at an excitation wavelength of 485 nm (excitation spectrum) and a measurement wavelength of 538 nm (fluorescence spectrum) was measured per sample by the use of a fluorescence detector. The result is shown in FIG. 8.

(Test 3)

This test was the same as Test 2 except that visible light was irradiated using a fluorescent lamp in place of the irradiation of ultraviolet light using the blacklight. The result is also shown in FIG. 8.

(Result and Consideration about Test 2 and Test 3)

As clear from the results shown in FIG. 8, in the diluted liquid of each of the solutions B and C in Examples 4 and 5, radicals were produced at a rate of 500 to 510 (nM/s) under irradiation of ultraviolet light, while radicals were produced at a rate of 95 to 100 (nM/s) under irradiation of visible light. On the other hand, among Comparative Examples 3 to 6 (solutions D to G), radicals were largely produced in the solution F of Comparative Example 5 under irradiation of either ultraviolet light or visible light. However, the radical production rates were 248 (nM/s) under irradiation of ultraviolet light and 41 (nM/s) under irradiation of visible light, which were much smaller than those in Examples 4 and 5 (solutions B and C). Moreover, in the solution G containing oxygen deficient titania and the amorphous titania solution D, radicals were hardly produced under irradiation of visible light. Further, with respect to the solution E obtained by applying the water-bath heat treatment to the solution D, the results were approximately the same as those of the solution D both under irradiation of ultraviolet light and under irradiation of visible light.

Figure 9:
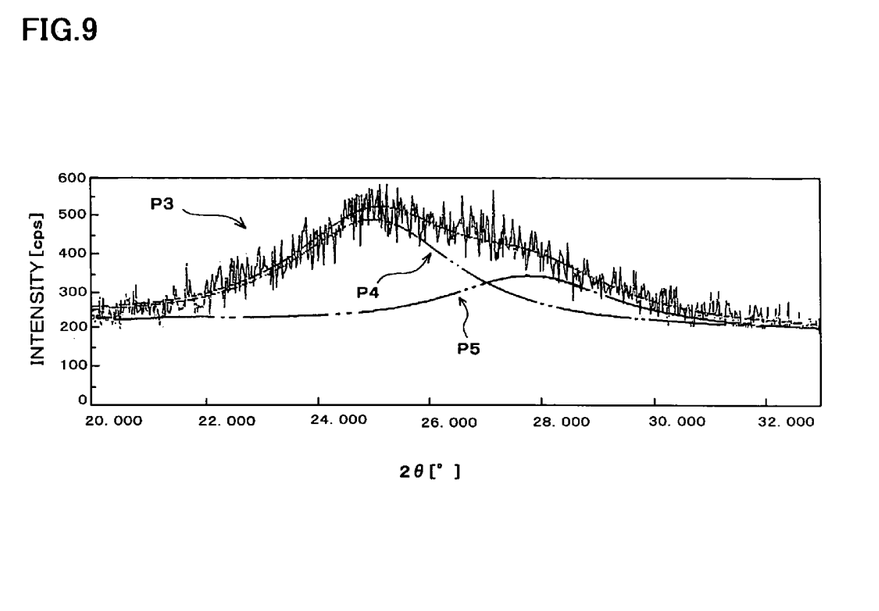
FIG. 9 is a characteristic diagram showing examples carried out for confirming the effect of the present invention.

From the foregoing results, it has been confirmed that, by applying a heat treatment, for example, at 97° C. for 4 to 9 hours to the solution containing amorphous titania and anatase titania, which has been produced by mixing the water in an excessive amount relative to TIP so that the mole ratio thereof becomes TIP/IPA/water=1/5/10, there can be obtained titania that exhibits extremely high activity (photocatalytic activity) both under irradiation of ultraviolet light and under irradiation of visible light. In order to examine a reason thereof, the present inventors have implemented X-ray diffraction, like in Test 1 as described above, about titania contained in the solution B produced in Example 4. The diffraction result corresponding to prescribed wavelengths is extracted and shown in FIG. 9. The present inventors have confirmed that a peak P3 appearing in a region over a range of about 22 to 30[°] is a peak that is formed by a peak P4 of anatase titania and a peak P5 of rutile titania conjointly at a certain ratio. Note that, with respect to the peaks P4 and P5, a peak of anatase titania alone and a peak of rutile titania alone obtained in advance by performing X-ray diffraction are shown in a superimposed fashion. Specifically, in this example, by applying a heat treatment at the predetermined temperature for the predetermined time to the solution containing amorphous titania and anatase titania, which has been obtained by mixing the water in an excessive amount relative to TIP, anatase-rutile type titania is produced in the solution, which is in the form of a mixture of anatase titania and rutile titania each having an extremely small particle size of about 2.7 nm and has a weight ratio of about 4/6 (rutile/anatase). It is presumed that the inclusion of such anatase-rutile type titania in the solution enables the exhibition of high activity not only under irradiation of ultraviolet light but also under irradiation of visible light. That is, to obtain the solution containing amorphous titania and anatase titania by mixing the water in an excessive amount relative to TIP is considered to be an important factor for securely producing anatase-rutile type titania containing anatase titania and rutile titania each having the foregoing extremely small particle size by applying the low-temperature heat treatment thereafter.

Example 6

In this example, an amorphous titania dispersed liquid was produced using the foregoing technique (steps S1 to S6 in FIG. 1), and was further subjected to a water-bath heat treatment. At the outset, TIP, IPA, and water were mixed together at a mole ratio of TIP/IPA/water=1/10/4. Titania produced in this liquid mixture was separated and then dried by airing at 100° C. to thereby obtain titania powder. The titania powder was added with 31 weight % aqueous hydrogen peroxide, then this solution was agitated while being controlled at 10° C. After further adding 31 weight % aqueous hydrogen peroxide, ammonia was added into the solution to adjust a pH to 3 to 4. Then, the solution was subjected to a water-bath heat treatment at 97° C. for 9 hours. This titania dispersed liquid is called a solution H.

Example 7

This example is the same as Example 6 except that a water-bath heat treatment was carried out at 97° C. for 5 hours. This titania dispersed liquid is called a solution I.

Example 8

This example is the same as Example 6 except that a water-bath heat treatment was carried out at 97° C. for 20 hours. This titania dispersed liquid is called a solution J.

(Test 4)

Figure 10:
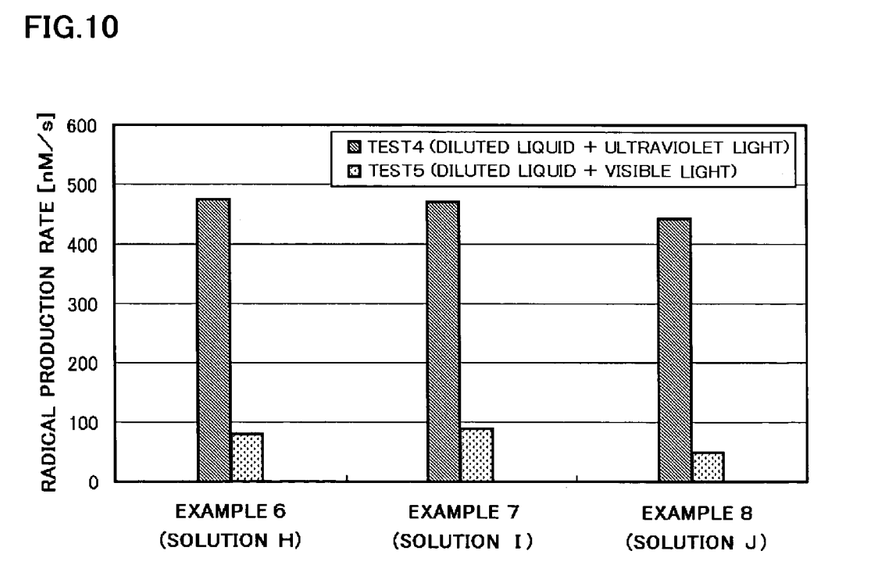
FIG. 10 is a characteristic diagram showing examples carried out for confirming the effect of the present invention.

The same test as Test 2 was conducted with respect to the solutions H to J of Examples 6 to 8. At the outset, 0.03 ml of each of the solutions H to J was measured into 3 ml of distilled water containing a fluorescent reagent (concentration of HPF (hydroxyphenyl fluorescein) was 10 μM) to thereby produce samples for analysis. Each sample was placed under irradiation of ultraviolet light by the use of a blacklight for 10 minutes while being agitated. Thereafter, the irradiation of ultraviolet light was stopped and each sample was agitated for 10 minutes in darkness. Then, the fluorescence intensity at an excitation wavelength of 485 nm (excitation spectrum) and a measurement wavelength of 538 nm (fluorescence spectrum) was measured per sample by the use of a fluorescence detector. The result is shown in FIG. 10.

(Test 5)

This test was the same as Test 4 except that visible light was irradiated using a fluorescent lamp in place of the irradiation of ultraviolet light using the blacklight. The result is also shown in FIG. 10.

(Result and Consideration about Test 4 and Test 5)

As clear from the results shown in FIG. 10, in the diluted liquid of each of the solutions H to J in Examples 6 to 8, radicals were produced at a rate of 440 to 475 (nM/s) under irradiation of ultraviolet light, while radicals were produced at a rate of 50 to 90 (nM/s) under irradiation of visible light. That is, it has been confirmed that, by applying a heat treatment at the predetermined temperature for the predetermined time to the amorphous titania dispersed liquid obtained by mixing TIP, IPA, and the water at the predetermined mole ratio, there can be obtained the titania solution that exhibits high activity both under irradiation of ultraviolet light and under irradiation of visible light like in the foregoing cases. It is presumed that such high activity is obtained due to production of anatase-rutile type titania in the solution like in the foregoing cases. However, as obvious from the results shown in FIGS. 8 and 10, the solutions B and C of Examples 4 and 5 exhibit higher activity as compared with the solutions H to J of Examples 6 to 8. That is, it is understood that the solution containing amorphous titania and anatase titania, which is obtained by mixing the water in an excessive amount relative to TIP, is suitable for producing more securely anatase-rutile type titania that exhibits high activity.

What is claimed is:

1. A method of producing a titania solution, comprising the steps of:

dissolving powder of titania in an acid solution and controlling a temperature of the titania-dissolved solution at 20° C. or below to produce a gel of amorphous titania;

mixing said gel of amorphous titania and an acid solution together to transform said gel of amorphous titania to a sol of amorphous titania; and supplying an alkali solution to the solution containing said sol of amorphous titania to adjust a pH of the solution to 2 to 10.

2. The method according to claim 1, further comprising a step of heating the solution containing said sol of amorphous titania to crystallize said amorphous titania to thereby produce anatase titania.

3. The method according to claim 2, wherein the step of crystallizing said amorphous titania comprises a step of mixing particles of amorphous titania and water together, a step of applying ultrasonic waves to the particles of amorphous titania, and a step of heating the water containing the particles of amorphous titania applied with the ultrasonic waves, at a predetermined temperature to produce particles of anatase titania, and the step of mixing the particles of anatase titania into the solution containing said sol of amorphous titania, and then the step of heating said solution.

4. The method according to claim 1, wherein said titania solution is a material of a coating film formed as a film on the surface of a base material.

5. The method according to claim 4, wherein said titania solution contains silica.

6. A method of producing a titania solution, comprising the steps of:

mixing together titanium tetraalkoxide, alcohol, and water that is excessive in amount relative to said titanium tetraalkoxide, to produce particles of anatase titania and amorphous titania; then separating said particles of anatase titania and said particles of amorphous titania from said solution and drying them; and thereafter dissolving said particles of anatase titania and said particles of amorphous titania in an acid solution to obtain a dispersed liquid in which said anatase titania and said amorphous titania are dispersed.

7. The method according to claim 6, wherein a mixing mole ratio of said titanium tetraalkoxide relative to said water is 1/10~80.

8. The method according to claim 7, wherein said titanium tetraalkoxide is titanium tetraisopropoxide, and said alcohol is isopropanol.

9. The method according to claim 6, further comprising a step of heating said dispersed liquid to produce anatase-rutile titania.

10. The method according to claim 6, wherein said dispersed liquid contains the alcohol.

11. The method according to claim 6, wherein said dispersed liquid is a material of a coating film formed as a film on the surface of a base material.

12. The method according to claim 11, wherein said dispersed liquid contains silica.

13. The method according to claim 6, wherein a production ratio between said anatase titania and said amorphous titania is changed by changing a mixing mole ratio of said water relative to said titanium tetraalkoxide.

14. The method according to claim 6, wherein the step of dissolving said anatase titania and said amorphous titania in the acid solution is carried out while controlling a temperature of said acid solution at 20° C. or below.

15. The method according to claim 6, further comprising a step of supplying an alkali solution to said dispersed liquid to adjust a pH or said dispersed liquid to 2 to 10.

* * * * *